United States Patent
Callegari et al.

(10) Patent No.: US 8,186,573 B2
(45) Date of Patent: May 29, 2012

(54) METHOD OF MARKING A DOCUMENT OR ITEM; METHOD AND DEVICE FOR IDENTIFYING THE MARKED DOCUMENT OR ITEM; USE OF CIRCULAR POLARIZING PARTICLES

(75) Inventors: Andrea Callegari, Chavannes-prés-Renens (CH); Eric Decoux, Vevey (CH)

(73) Assignee: SICPA Holding SA, Prilly (CH)

( * ) Notice: Subject to any disclaimer, the term of this patent is extended or adjusted under 35 U.S.C. 154(b) by 0 days.

(21) Appl. No.: 12/597,047

(22) PCT Filed: Apr. 18, 2008

(86) PCT No.: PCT/EP2008/003116
§ 371 (c)(1),
(2), (4) Date: Apr. 16, 2010

(87) PCT Pub. No.: WO2008/128714
PCT Pub. Date: Oct. 30, 2008

(65) Prior Publication Data
US 2010/0200649 A1    Aug. 12, 2010

(30) Foreign Application Priority Data

Apr. 24, 2007    (WO) ................ PCT/EP2007/003588

(51) Int. Cl.
*G06F 17/00*    (2006.01)
(52) U.S. Cl. ........................ 235/375; 235/460
(58) Field of Classification Search .................. 235/375, 235/380, 385, 435, 439, 454, 457, 460
See application file for complete search history.

(56) References Cited

U.S. PATENT DOCUMENTS

| | | | |
|---|---|---|---|
| 3,636,318 | A | 1/1972 | Lindstrom et al. |
| 4,150,781 | A | 4/1979 | Silverman et al. |
| 4,218,674 | A | 8/1980 | Brosow et al. |
| 4,527,051 | A | 7/1985 | Stenzel |
| 4,661,983 | A | 4/1987 | Knop |
| 4,677,435 | A | 6/1987 | Causse D'Agraives et al. |
| 5,018,830 | A | 5/1991 | Krop |
| 5,211,877 | A | 5/1993 | Andrejewski et al. |
| 5,325,167 | A | 6/1994 | Melen |
| 5,362,315 | A | 11/1994 | Mueller-Rees et al. |
| 5,434,917 | A | 7/1995 | Naccache et al. |
| 5,521,984 | A | 5/1996 | Denenberg et al. |

(Continued)

FOREIGN PATENT DOCUMENTS

DE    44 18 490 A    11/1995

(Continued)

OTHER PUBLICATIONS

International Preliminary Report on Patentability issued in International Application No. PCT/EP2008/003116.

*Primary Examiner* — Michael G Lee
*Assistant Examiner* — Matthew Mikels
(74) *Attorney, Agent, or Firm* — Greenblum & Bernstein, PLC

(57) ABSTRACT

Optical identification and/or authentication of a document or item with the help of a marking comprising a random distribution of circular polarized light reflecting particles, the marking being applied to the document or item through an ink, and the reading device exploiting circular polarization to discriminate the flakes from the background.

21 Claims, 9 Drawing Sheets

U.S. PATENT DOCUMENTS

Figure 1:
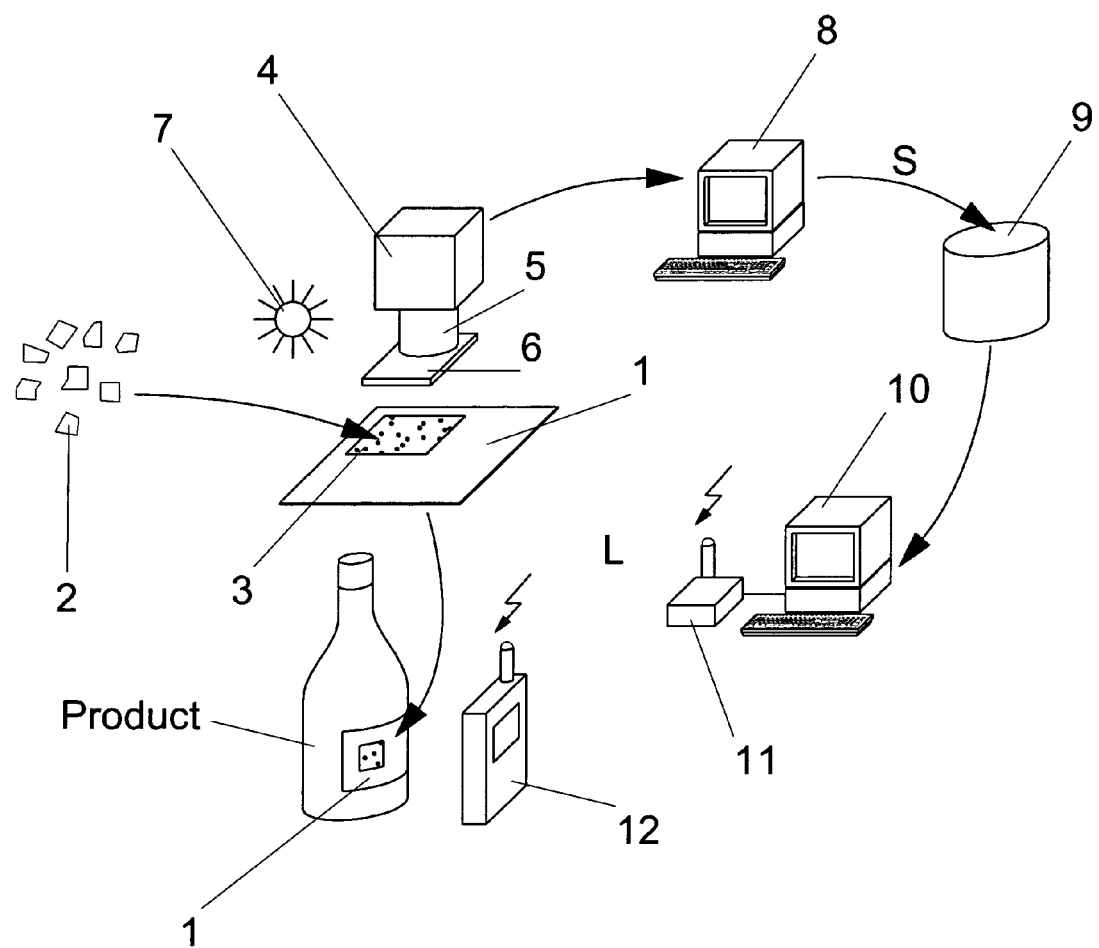

| | | | |
|---|---|---|---|
| 5,602,381 A | | 2/1997 | Hoshino et al. |
| 5,683,622 A | | 11/1997 | Kratzschmar et al. |
| 6,224,664 B1 | | 5/2001 | Muller-Rees et al. |
| 6,274,873 B1 | * | 8/2001 | Outwater et al. .......... 250/458.1 |
| 6,423,246 B1 | | 7/2002 | Kasch et al. |
| 6,473,165 B1 | * | 10/2002 | Coombs et al. ................. 356/71 |
| 6,565,002 B1 | | 5/2003 | Tel |
| 6,584,214 B1 | | 6/2003 | Pappu et al. |
| 6,829,075 B1 | * | 12/2004 | Kosc et al. ..................... 359/272 |
| 2002/0086113 A1 | | 7/2002 | Leigeber et al. |
| 2002/0126889 A1 | | 9/2002 | Pikler et al. |
| 2003/0048522 A1 | * | 3/2003 | Liang et al. ................... 359/296 |
| 2004/0112962 A1 | | 6/2004 | Farrall et al. |
| 2005/0017082 A1 | | 1/2005 | Moran et al. |
| 2005/0190914 A1 | | 9/2005 | Chen et al. |
| 2005/0226129 A1 | | 10/2005 | Carr |
| 2005/0239207 A1 | | 10/2005 | Gelbart |
| 2005/0276906 A1 | | 12/2005 | Metzger et al. |
| 2006/0097514 A1 | * | 5/2006 | Nishimura et al. .............. 283/90 |
| 2006/0124741 A1 | * | 6/2006 | Mayer et al. .................. 235/454 |
| 2007/0024698 A1 | * | 2/2007 | Engstrom et al. .......... 348/14.01 |
| 2007/0063051 A1 | | 3/2007 | Laszlo et al. |
| 2007/0071951 A1 | | 3/2007 | Grande et al. |
| 2007/0194129 A1 | | 8/2007 | Jones |
| 2007/0199991 A1 | | 8/2007 | Haraszti et al. |
| 2008/0069979 A1 | | 3/2008 | Raksha et al. |
| 2008/0138604 A1 | | 6/2008 | Kenney et al. |
| 2008/0210757 A1 | | 9/2008 | Burden et al. |
| 2008/0265036 A1 | | 10/2008 | Wichers et al. |
| 2008/0305315 A1 | | 12/2008 | Kasch et al. |
| 2010/0178508 A1 | | 7/2010 | Kasch et al. |

FOREIGN PATENT DOCUMENTS

| | | | |
|---|---|---|---|
| DE | 199 22 158 A | | 11/2000 |
| DE | 102 11 310 A | | 10/2003 |
| EP | 0 161 181 A | | 11/1985 |
| EP | 0 911 758 | | 4/1999 |
| EP | 1 028 359 | | 8/2000 |
| EP | 1 475 242 | | 11/2004 |
| EP | 1876216 A1 | | 1/2008 |
| FR | 2765014 B1 | | 12/1998 |
| JP | 2003 073600 | | 3/2003 |
| WO | 95/08786 A | | 3/1995 |
| WO | 95/17474 A | | 6/1995 |
| WO | 95/17475 A | | 6/1995 |
| WO | 95/17479 A | | 6/1995 |
| WO | 95/17480 A | | 6/1995 |
| WO | 98/45826 A | | 10/1998 |
| WO | WO 0250790 A1 | * | 6/2002 |
| WO | 03/054259 A | | 7/2003 |
| WO | 2004/013735 A | | 2/2004 |
| WO | 2004/070667 A | | 8/2004 |
| WO | 2006/120643 A | | 11/2006 |
| WO | 2007/128966 A | | 11/2007 |
| WO | 2007/133163 A | | 11/2007 |
| WO | 2008/059552 A | | 5/2008 |

* cited by examiner a)

b)

a)

b)

c)

METHOD OF MARKING A DOCUMENT OR ITEM; METHOD AND DEVICE FOR IDENTIFYING THE MARKED DOCUMENT OR ITEM; USE OF CIRCULAR POLARIZING PARTICLES

RELATED APPLICATIONS

This application is the U.S. National Stage of International Application No. PCT/EP2008/003116, filed Apr. 18, 2008, which claims the benefit of PCT application No. PCT/EP2007/003588, filed Apr. 24, 2007. The entire teachings of the above applications are incorporated herein by reference.

FIELD OF INVENTION

The invention is in the field of marking and identifying a document or item. It concerns a method for providing a document or an item with a unique, individual mark; a method and a device of identifying the marked document or item; as well as the use of circular polarizing particles to produce a unique, individual mark.

STATE OF THE ART

In the field of value document certification or identity control, the recognition of an individual document or item among a large quantity of similar items, i.e. the identification of the item, is often required. Identification is recognizing something or someone as a specific individual. Other times, only a certification of the object's genuineness, i.e. authentication is required. Authentication is establishing or confirming something or someone as belonging to a certain class. Note that if identity is ascertained, the item is authentic. The reverse is not true.

A number of different solutions for identifying or authenticating documents or items have been proposed in the art. Of particular interest are methods exploiting a random characteristic of the document or item as the individualizing element. The random characteristic may herein either be naturally present on or in, or deliberately introduced into the document or item.

U.S. Pat. No. 4,661,983; WO 94/29817A1; U.S. Pat. No. 4,677,435; FR 2765014B1; WO 96/03714A1; U.S. Pat. No. 6,584,214 describe the use of a naturally present random characteristic for the identification of an individual document or item. The characteristic is used as a signature which can be stored externally, and used to authenticate the document or item, either visually or electronically.

U.S. Pat. No. 4,661,983; U.S. Pat. No. 3,636,318; U.S. Pat. No. 4,218,674; U.S. Pat. No. 4,150,781; DE 2829778; EP 0 161 181; U.S. Pat. No. 5,018,830; U.S. Pat. No. 5,325,167; U.S. Pat. No. 5,602,381; FR 2765014; WO 99/38128; WO 02/50790; WO 04/070667; WO 05/104008; WO 2005/008294; WO 2006/078220 describe the use of a random distribution of particles to authenticate or identify an individual item. The particles, e.g. pigment particles, fibers, etc., can herein either be an intrinsic part of the material of the item, or alternatively, they may be added on purpose to the item, e.g. via a printed ink.

WO 05/104008 discloses a method of verifying the authenticity or identity of an article. It involves producing a representation of a distribution pattern of randomly distributed taggant particles on the article, and producing a match signal when the representation at least partially matches a pre-recorded representation of the distribution pattern of the randomly distributed taggant on the article.

U.S. Pat. No. 3,636,318, U.S. Pat. No. 4,218,674, U.S. Pat. No. 5,602,381, FR 2765014B1 describe the use of a random distribution of magnetic particles to authenticate or identify an individual item.

U.S. Pat. No. 3,636,318 discloses an identity document comprising a random pattern of finely divided ferromagnetic material. The authentication or identification of said document is performed by comparing its characteristic magnetic signature with the signature previously recorded by the issuing authority and stored in a database.

U.S. Pat. No. 4,218,674 discloses a method and a system for verifying the authenticity or identity of an object having random imperfections, preferably a distribution of magnetic particles such as magnetic fibers. Herein, said random imperfections are scanned along a predetermined measuring track over the surface of said object, and the resulting signal is stored in the form of a binary code. For authentication or identification, the stored binary code is compared with the result of another scan along the measuring track.

U.S. Pat. No. 5,602,381 discloses marked objects, as well as a method and an apparatus for checking whether or not said objects are authentic. A large number of magnetic polymer elements are incorporated into a region of the object during the manufacturing process. The authentication or identification is performed by magnetically scanning the said region, and the signal so obtained is specific to the individual object. Said signal varies in accordance with the density, sizes, embedded depth, length, and orientation of the magnetic polymer elements.

FR2765014B1 discloses a method for authenticating or identifying a printed document comprising a magnetic ink having a random distribution of magnetic particles. The particle distribution on the document is determined, associated to the said document, and recorded in a database. In a later control step for checking the authenticity of the document, the particle distribution is determined again and compared with the pre-recorded distribution. The document is deemed authentic if the comparison matches.

As it is obvious for those skilled in the art, the authentication of a distribution of magnetic particles such as disclosed in U.S. Pat. No. 3,636,318; U.S. Pat. No. 4,218,674; U.S. Pat. No. 5,602,381; FR 2765014B1 needs a close contact between the authenticating device and the item to be authenticated. However, said contact between the item and the authenticating device may easily lead to a jamming of the item, in particular if the item to be authenticated is made of paper and is in a bad shape. This is a particular disadvantage in case of banknote accepting ATMs (Automated Teller Machines) or AVMs (Automated Vending Machines) because multiple service intervention may be required.

U.S. Pat. No. 5,325,167 describes the use of a random distribution of toner particles to authenticate or identify an individual document or item. A "grain seal site" of said document or item, at a predetermined location, is scanned at a first point in time, and the data obtained are recorded in a database. To authenticate the document or item at a later point in time, a comparison is made between the data obtained from a new scan of the "grain seal site" and the previously stored reference data.

The size of a toner particle is very small, of the order of 10 micrometers. On a laser-printed document, single randomly scattered toner particles can be seen under an optical microscope outside the printed areas. The distribution of such toner particles, representing a random arrangement and being unique for each printed item, can be used to identify the item. The practical implementation of such identification, requiring a microscope and a very precise positioning, may, however, not be feasible outside a laboratory. It is not evident either, how a useful authentication speed can be achieved under industrial conditions, because the microscopic area containing the unique arrangement of small toner particles identifying the item must be correctly found and positioned. Said area is necessarily chosen small, in order to avoid the handling of a large quantity of particle positional data, which would slow down the comparison with the reference data, and therefore the whole identification operation.

U.S. Pat. No. 4,527,051; WO 02/50790; DE 2829778 describe the use of a random distribution of luminescent particles to authenticate an individual item.

U.S. Pat. No. 4,527,051 discloses a security document such as credit or identification card, having a printed line formed by a random distribution of coarse-grained luminescent pigment particles. The location of the fluorescent line is on the signing stripe of the card. The signing stripe and the signed name itself are not luminescent. Upon irradiation of the card with exciting radiation, the individual luminescent particles emit their characteristic response radiation. The locations of the luminescent particles along the line, as well as the interruption of the luminescence at the points of intersection with the cardholder's signature, result in a unique signal pattern, which can be read by a machine and stored as a proof of authenticity of the card.

According to the teaching of U.S. Pat. No. 4,527,051, the luminescent pigment particles must be coarse-grained so that each particle provides a clear and bright luminescence signal, useful for the determination of the particle distribution. These luminescent particles, having a roughly spherical shape, cannot be used in the most common printing processes, such as offset, heliography and flexography printing due to their excessive 3-dimensional size. This is a first shortcoming of the prior art based on a luminescent particle distribution.

The excitation light must furthermore be of high intensity, in order to generate a sufficiently strong luminescence response in order to reduce the time it takes to acquire a clear image of the luminescent particle distribution. Luminescence signals are generally weak, due to the intrinsic low efficiency of the luminescence energy conversion process, which is a significant obstacle to high speed authentication, such as often required in banknote processing. The method and means disclosed in U.S. Pat. No. 4,527,051 are thus restricted to operate at low to moderate authentication speed, which is another shortcoming of this prior art.

WO 02/50790 discloses a security tag manufacturing method; the security tag containing randomly distributed particles, said particles including reflective and/or refractive layers. According to WO 02/50790, not only the presence of reflective and/or refractive particles at particular positions, but also the orientation of each individual, reflective particle is exploited. The reflective particles are small and the resulting optical random pattern is extremely complex, providing a system that is highly robust against physical reconstruction. Said pattern is then used to generate unique identity information for each object.

Figure 2:

A disadvantage of the method of authentication/identification of WO 02/50790 is the large number of particles present in the identification zone of the tagged item, requiring some sort of selection to be effectuated on the raw data before the particle distribution can be compared with the stored reference data (e.g. image enhancement processing according to FIG. 2 of the cited document). Also, determining the orientation of the flakes requires complex reading equipment; furthermore, the said orientation of the flakes in the coating can change with time, under mechanical or chemical influences (crumpling, wetting, etc.).

Despite the many methods, markings, authentication equipment and systems disclosed in the prior art, which all make use of a random particle distribution as an identification means for documents or items, none of them has resulted in a large scale application. The reasons for this are one or more of the following:

a) The required contact of the reader device with the document or item in case of magnetic marking particles, which potentially leads to jamming;
b) The small detection area, which is difficult to find and to focus correctly on the document or item;
c) The required use of coarse-grain particles, hardly compatible with common printing techniques in case of luminescent markers;
d) The large or even excessive quantity of position- and orientation-information of particles to be handled; which requires either an important data base and very performing search algorithms, or a pre-selection of a part of the marking particles to be effectuated;
e) The time-consuming processing operations originated by the occurrence of one or more of the preceding points;
f) The low resistance of the marking to mechanical or chemical damage;

Ideally, a deliberately introduced random characteristic, embodied by a marking having a random distribution of particles, and the corresponding authentication means should comply with the following requirements:

a) no mechanical contact between the document or item and the reading device;
b) sufficiently large detection area, to allow for easy localization and focusing;
c) strong signal response of the marking;
d) compatibility with a large variety of application techniques;
e) small size of generated positional information data records;
f) particles easy to find;
g) capable of high operation speed;
h) high durability/stability of the marking;

SUMMARY OF THE INVENTION

The present invention overcomes the shortcomings of the prior art, and discloses a method of marking, a marking, and a device for authenticating and/or identifying a document or item, wherein the marking relies on a random distribution of easily recognizable, circular polarizing particles; said particles being applied to the document or item via a printed ink or a coating composition.

In particular, use is made of marking particles having the property of reflecting circular polarized light, in conjunction with corresponding authenticating equipment. This allows an easy distinguishing of the marking on almost all backgrounds, even if the latter is colored and/or reflective. The marking according to the invention is practicable on most materials and substrates, such as paper, plastics, metal, glass, printed items, etc.

The use of circular polarizing particles allows noteworthy to evaluate the marking under more than one polarization conditions, selected from the unpolarized, left-circular polarized, and right-circular polarized conditions, wherein the polarization condition selection may be applied either between the light source and the marking, or between the marking and the observer or observation device, or both of them. At least two images of the marking under different polarization conditions are conveniently subtracted from each other, forming a polarization difference image, which no longer comprises contributions from the background, but represents a neat image of the marking. Particularly preferred in the context of the present invention is forming the difference of each an image taken under left-circular and under right-circular polarization condition. The invention relies thus on the existence of a different reflection coefficient of the marking particles for left- and right-circular polarized light, i.e. the reflected light from the marking particles under unpolarized illumination has at least a circular-polarized component.

The chosen marking particles are flat flakes, which, on the one hand, have a significant two-dimensional size (typically micrometers or more), and therefore allow for an easy detection and, at the same time, are not easily lost due to friction, wear or crumpling of the document or item carrying the marking, and which, on the other hand, have a small thickness (typically about 5 micrometers), which makes them compatible with the common printing processes.

In an important aspect of the invention, the marking particles are applied at low surface density, i.e. so as to result in a moderate number of particles present over the marking area, in order to limit the data set representing the marking to a size which can be easily treated and stored on existing processing equipment and at sufficient speed.

In another aspect of the invention, the marking area has a sufficiently large, non-microscopic size, so as to facilitate its localization and scanning on the document or item.

A first object of the present invention is to provide a method of authenticating or identifying an item with the help of a random distribution of circular polarizing particles, disposed on the document's or item's surface, and constituting a marking.

A second object of the invention is to provide a security document or item having an area comprising a random distribution of circular polarizing particles, which can be authenticated optically, in a non-contact way.

A further object is to provide a reading device which has the capability to authenticate/identify the said particle distribution on the said document or item.

The present invention also comprises an ink or coating composition comprising circular polarizing particles to perform the said marking, a laminate or extruded film comprising an appropriate concentration of circular polarizing particles, as well as a document or item imprinted or coated with said ink or coating composition, or carrying said laminate or extruded film.

According to the invention, the circular polarizing particles are preferably embodied as cholesteric liquid crystal polymer (CLCP) flakes. Such polymers reflect a circular polarized light component; that means that within a determined wavelength range, light having a determined circular polarization state (left- or right-handed, depending on the polymer) is predominantly reflected.

Cholesteric liquid crystal polymers have a molecular order in the form of helically arranged molecular stacks. This order is at the origin of a periodic spatial modulation of the material's refractive index, which in turn results in a selective transmission/reflection of determined wavelengths and polarizations of light. The particular situation of the helical molecular arrangement in CLCPs causes the reflected light to be circular polarized, left-handed or right-handed, depending on the sense of rotation of the molecular helical stack.

A marking, comprising a random distribution of circular polarizing particles, such as can be applied to a document or item via coating composition comprising CLCP flakes, provides thus the said document or item with a unique optical signature, detectable and distinguishable through its specific reflection of circular polarized light. Said particles, being randomly present in the ink, also appear in random positions and orientations on the printed document or item. The marking, which is almost transparent, but distinguishable from the background through its polarization effect, can be used in all kind of authentication, identification, tracking and tracing applications, for all kind of documents or goods.

DETAILED DESCRIPTION

The method of marking and identifying or authenticating an item according to the present invention comprises the steps of a) providing an item, such as banknote, a voucher, an ID-document, a plastic card, a stamp, a label, a packaging, a good, etc. with a random distribution of particles, said particles being chosen as cholesteric liquid crystal polymer (CLCP) flakes; b) recording and storing, at a first point in time, data representative of said random distribution of flakes, using a reading device comprising illumination means and optical detection means; c) identifying or authenticating the marked item at a later point in time using a reading device as in step b) and said stored data representative of said random distribution of particles. The reading devices of step b) and c) need not to be the same, nor of the same type.

The term "reading device" designates a device which is capable to identify or to authenticate a document or item marked according to the present invention. In addition to this, the reading device may have other capabilities, such as that of reading barcodes, taking images, etc. The reading device may in particular be a modified barcode reader, camera mobile phone, optical scanner, etc.

The said method is characterized in that said CLCP flake reflects a circular polarized light component, preferably in at least one spectral area chosen from the ultraviolet, the visible, and the infrared electromagnetic spectrum, i.e. between 300 nm and 2500 nm wavelength, and that said reading device exploits circular polarization to discriminate the flakes from the background by forming a circular polarization difference image.

Said exploitation of circular polarization may occur as disclosed in WO 2004/11273 A2, A3. Each an image is hereby recorded through a left-circular polarizing and a right-circular polarizing filter, respectively, of the random distribution of particles, and the difference image between the so obtained 'right-handed' and 'left-handed' images is formed on a pixel-by-pixel base. This noteworthy eliminates all image components which are not reflecting circular polarized light.

With reference to Table I, the detected light intensity from a right-polarizing flake having the reflection coefficient $F_R$, on a totally absorbing background, for a given wavelength, can be quantified as follows:

a) Illumination with left-polarized light of intensity $I_L$:

| Filter: L | Filter: R | No filter | Intensity R − L |
|---|---|---|---|
| ○ | ○ | ○ | ○ | b) Illumination with right-polarized light of intensity $I_R$:

| Filter: L | Filter: R | No filter | Intensity R − L |
|---|---|---|---|
| ○ | $I_R * F_R$ | $I_R * F_R$ | $I_R * F_R$ | c) Illumination with unpolarized light of intensity I:

| Filter: L | Filter: R | No filter | Intensity R − L |
|---|---|---|---|
| 0 | $I*F_R/2$ | $I*F_R/2$ | $I*F_R/2$ |

For the situation where the background is not totally reflecting, the intensities are given in Table 1.

If a CLCP flake is located on a background which equally reflects right- and left-handed circular polarized light components, the background contribution is subtracted when forming the intensity R-L, and thus eliminated from the subsequent signal processing steps, which may thus concentrate on the mere marking particles.

To subtract the left- and the right-handed images of each other in a way which makes sense, the said images need first to be put to scale and aligned with each other. This means, that the respective pixels of corresponding image elements have to be matched. This can be a more or less cumbersome task, depending on the respective image distortions which are present. The ideal case is clearly that both, the left- and the right-handed images are recorded at the same distance, under the same angle, and through the same camera and optics. In such case an image scaling or alignment is noteworthy rendered superfluous.

As is obvious for the skilled man, the required images of the marking under left-handed circular and right-handed circular polarization can be obtained in different ways, in each of them, however, the reading device must have at least one circular polarizing filter. Preferably, the reading device has each a right- and a left-circular polarizing filter:
  a) using two cameras, equipped with a left-handed and a right-handed circular polarization filter, respectively; in order to obtain two "parallel" images taken at the same distance and under the same angle of view, a single optics combined with a beam-splitter can be used;
  b) using a single camera having beam-splitting and left- and right-handed polarization selection means, yielding a split image corresponding to the left- and the right-handed polarized view of the item; this option is particularly useful for low-cost equipment;
  c) using a single camera in combination with an electro-optic filter, such as disclosed in DE 102 11 310, allowing for the alternative selection of right- and left-handed circular polarization;
  d) using left- and right-handed circular polarized illumination means.

In option c), the left- and right-handed images are acquired sequentially, which takes twice the acquisition time as for options a) or b); however, it has the advantage that the pixels of the right- and the left-handed circular polarized images are already exactly coincident, avoiding time-consuming image-matching algorithms to be carried out. The use of a single camera makes this option also useful for low-cost equipment.

In embodiment, d), a camera without circular polarizing filter is used, and the marking is illuminated sequentially with left- and with right-handed circular polarized light, and the corresponding left-handed and right-handed image data are recorded sequentially. As is the case for embodiment c), embodiment d) has also the advantage that the pixels of the left- and the right-handed circular polarized images are already exactly coincident, avoiding time-consuming image-matching algorithms to be carried out. The use of a single camera makes this option also useful for low-cost equipment.

Sequential illumination by right- and left-handed circular polarized light can also be combined with embodiments a) to c) given above.

The left- and right-handed circular polarized light can be obtained in two ways, either by two sequentially illuminated light sources, equipped with a left- and a right-handed circular polarizing filter, respectively, or by a single light source, equipped with an electro-optic filter for the alternate selection of left- and right-handed circular polarization.

The light sources can furthermore be spectrally selective light sources, such as light-emitting diodes (LED) or laser diodes (LD). The circular polarizing filter can also be combined with color filters.

The image sensor device used for the image acquisition can either be a monochrome or a color image sensor, of either the CMOS or the CCD type, as known to the skilled man. Silicon-based monochrome image sensors are sensitive in a wavelength range which exceeds the visible domain, extending from less than 350 nm to about 1,100 nm. Further to their usefulness in the visible range (400 nm to 700 nm) such image sensors can be used to acquire an image in the near-ultraviolet (UV) range (wavelengths below 400 nm), as well as in the near-infrared (IR) range (wavelengths above 700 nm). Image sensors made of other semiconductors, such as germanium (Ge) or indium-gallium-arsenide (InGaAs) allow imaging in the farther optical infrared range, up to 2,500 nm wavelength.

The camera or image sensor acquiring the image, as well as the light source, can further be equipped with optical filters (hereafter called 'color filters'), to select a spectral range where the marking reflects circular polarized radiation. In a preferred embodiment, said authentication device has at least one color filter, which can be a colored glass or an interference filter, of the band-pass, long-pass or short-pass type; the pass region being the wavelength region where the filter is at least partially transparent to electromagnetic radiation.

The cholesteric liquid crystal polymer (CLCP) flakes have at least one spectral reflection band in at least one of the ultraviolet (below 400 nm), visible (400 nm to 700 nm) or infrared (700 nm to 2,500 nm) electromagnetic spectrum. The said spectral reflection band may be of the narrow-band (half-width below 50 nm) or of the broad-band (half-width 50 nm or more) type. The light reflected by the CLCP flake within the spectral reflection band is predominantly circular polarized, i.e. either left- or right-handed circular polarized.

Circular polarization is a propagation mode of electromagnetic radiation, such as light, wherein the electric field vector describes a circle as time progresses. The electric vector, thus, describes a helix along the direction of wave propagation. Circular polarization may be referred to as left-handed or right-handed, according to the sense of rotation of the electric field vector.

In a further, preferred embodiment, the CLCP flake has at least two spectral reflection bands in at least one of the ultraviolet, visible and infrared electromagnetic spectrum. Flakes having this property have a multilayer structure and are disclosed in the co-pending application EP06116141.0 of the same applicant, which is herein included by reference. In particular, flakes can be made wherein each spectral reflection band is individually left- or right-handed circular polarized. As an example, a CLCP flake having two narrow spectral reflection bands at 450 nm and at 650 nm, has one of four different possible 'polarization flavors', noteworthy 450(right)-650(right), 450(right)-650(left), 450(left)-650(right), 450(left)-650(left). In addition to spectral reflection and the polarization of the reflected light, the flake can also be made to have further properties, such as luminescence, magnetic properties, etc.

The detection area, i.e. the area in which the marking is exploited to identify or authenticate the item, may be of smaller size than the marking itself. The random distribution of easily recognizable, circular polarizing particles is preferably exploited in a detection area of at least 1 mm², preferably at least 25 mm², more preferably at least 100 mm². The choice of a macroscopic detection area simplifies the localization and reading of the marking in an industrial application where speed is crucial.

The detection area can however be as small as one square mm or less, whenever said area can be readily identified (e.g by the means of other graphical elements present on the mark). Likewise the detection area may be as large as the whole visible surface of the object. The two technical problems which must be solved with respect to the detection area are a) to rapidly find and unambiguously delimit the relevant area, and b) to reliably read its contents. The first problem can be addressed e.g. by relying on another visible or detectable feature, which indicates and delimits the detection area; the second problem is addressed through the use of circular polarizing marking particles according to the present invention.

Even where only few random CLCP flakes are present in a marking, the chances that the positions of the flakes in a first marking match the positions of the flakes in second marking are extremely low. As few as about twenty CLCP flakes are sufficient to produce a unique signature that is virtually unrepeatable, while at the same time very compact to store. Taking the case of a detection area digitalized into 32×32 fields, i.e. a total of 1024 fields. Each particle is attributed to (can occupy) one of these fields, and can thus be represented as a letter out of an alphabet of 1024-$10^3$ characters; having 20 particles, the number of possible combination is thus of the order of $10^{23}$ ! On the other hand, it is also clear to the skilled person that a much higher number of digitalization fields and a much higher number of flakes can be used to improve the resistance of the marking if the available data storage and processing capacity allow for this.

Alternatively the area of 32×32 fields may be represented as an array of 32 digital numbers of 32 bits each. If a field is occupied by at least one flake, then the corresponding bit of the corresponding number is 1; else 0.

Said random distribution comprises between 3 and 1000 flakes located within the detection area, preferably between 10 and 300 flakes, more preferably between 30 and 100 flakes. The appropriate number of flakes per area can easily be set for a given application process by adopting appropriate concentrations of flakes in the applied material. If the marking is applied by screen printing, a flake concentration of the order of 1% in the screen-printing ink is usually suited to produce the required number of flakes per area on the printed document.

Preferably, the random distribution of particles is produced on an outer surface of a finished item, by applying a coating composition or by affixing a foil to the item. The coating may e.g. be a protection varnish comprising the required amount of CLCP flakes as an additional ingredient. Given the high transparency of the CLCP flakes, such marking is almost invisible for the unaided eye, but can be evidenced using the specific polarization effect exhibited by the CLCP flakes, if needed in combination with an optical color filter.

The CLCP flakes can, however, be applied by any application technique, either by i) coating or printing the item or part of it with a liquid coating composition, with a pasty coating composition, or with a solid, in particular a heat-meltable powder coating composition (e.g. toners used for laser printers and copiers), or by "bronzing"; or by ii) affixing to the item a label, a laminate, a film, a transfer foil, or any transferable object previously treated as under i) above. The item may thus comprise or be itself a label, a laminate, a film, a transfer foil, or any transferable object comprising a said random distribution of CLCP flakes.

It must, however, be assured that the flakes survive on the printed document or item, in order to allow for their later authentication/identification. In case of a final over-varnishing or over-laminating step (as in banknotes, cards or ID-documents), the particles can be considered as solidly fixed to the document or item, independent on how they were applied to it.

The preferred particles are flakes of the type described in EP06116141.0 and related documents. CLCP pigments useful to carry out the present invention are disclosed in EP 1 213 338 B1; EP 0 685 749 B1; DE 199 22 158 A1; EP 0 601 483 A1; DE 44 18 490 A1; EP 0 887 398 B1, and WO2006/063926. Reference is also made to U.S. Pat. No. 5,211,877, to U.S. Pat. No. 5,362,315 and to U.S. Pat. No. 6,423,246. Such particles have a thickness of the order of 1 to 10 micrometers and a flake size of the order of 10 to 100 micrometers, and are obtained by comminution of a corresponding liquid-crystal-polymer precursor film. The preferred flakes for use in the present invention have a thickness in the range of 1 to 10 micrometers, and an average flake size in the range of 20 to 100 micrometers.

The flakes are preferably applied to the document or item via a coating composition. This implies that an appropriate amount of flakes is mixed into a coating composition comprising at least a binder as an additional component. The appropriate concentration of flakes in the binder is in the range of between 0.01% and 20% by weight; preferably between 0.1% and 3% by weight; most preferred is a concentration in the range of between 0.2% and 1% by weight. The binder may comprise additional components, in particular fillers and additives, as well as coloring agents and other ink security elements.

The preferred flake density of the marking is not higher than 100 flakes per square millimeter, preferably not higher than 35 flakes; most preferably not higher than 7 flakes per square millimeter.

The marking may further consist of different types of particles. It is still further possible to hide a marking, represented by said flakes of determined circular polarization at said density, within a much larger number of other pigment particles; the latter being of the same or a different nature, and having the same or a different color. In particular, a marking represented by a small number of cholesteric liquid crystal pigment flakes of one circular polarization, can be hidden in a large number of cholesteric liquid crystal pigment flakes of the opposite circular polarization.

The printing inks or coating compositions suitable for the embodiment of the present invention must thus at least comprise the varnish component (binder) and the marking (CLCP) flakes. Optionally, pigments, dyes, extenders, additives, photoinitiators, etc. may be present.

The substrate onto which the CLCP flakes are applied can be of any material compatible with the printing ink or varnish; preferably the substrate is a paper, a cardboard, a plastic, or a metal. Also woven materials and felts may be coated. The substrate can furthermore be black, white, colored and/or reflective. While a black substrate provides the best contrast to perceive the CLCP flake reflection, the polarizing properties of the flakes allow the discrimination of the flakes from the background even if the latter is not black. The substrate may also contain indicia such as a text, or a bar or matrix code.

As is obvious to the skilled person, the coating comprising the CLCP flakes can be overprinted or coated with indicia, such as a text or a bar- or matrix code, foreseen that at least a fraction of the flakes remain detectable for authentication.

The coating method is preferably chosen among the common large-area printing techniques, such as gravure printing, flexographic printing, and screen printing. The hardening of the binder after coating ensures that the marking particles are fixed in place and stay there solidly anchored. This is important in view of using the random distribution of individual particles as a marking and identification means, to provide a robust, durable, and stable identifier under the normal conditions of use of the item.

In the case where the marking is applied by 'gravure printing', the preconfigured pattern of the cups of the 'gravure' printing plate may serve as a 'natural' digital array of ink droplet deposition sites. Each such droplet may contain at least one flake—in which case the digital value of the array element would be assigned as '1'—or no flake at all—in which case the digital value of the array element would be assigned as '0'. Such 'natural' digitalization of the positional information of the flakes can be helpful in the reading of the marking, in order to correctly position the reading mask in a straightforward and rapid way. The probability of having an array element occupied by one or more pigment flakes is a function of the concentration of flakes in the printing ink. Other printing processes than 'gravure printing' may be used to the same effect of depositing ink droplets in a preconfigured pattern, noteworthy flexo- or ink-jet printing.

A marking of this kind is highly resistant to the influence of its environment, because, once fixed, the particles are unlikely to change their positions. If they are sufficiently large, it is also unlikely that they get lost due to friction or wear. In the case where a high density of flakes is used, such as a density representing a full surface coverage over a delimited area of a printed feature—which can e.g. be obtained using a screen-printing ink containing about 20% of CLCP flake pigment by weight—it is advantageous to select a subset of the total number of flakes present to keep the data representation of the random distribution within process-able limits. Said data representative of said random distribution is then obtained by selecting a number of flakes among a larger total number according to a pre-defined overall criterion, such as position, orientation, or graphic design.

The position criterion can be implemented e.g. such that only the positions of isolated particles along the borderline of the printed feature are considered, and that the positions of the cumulated particles inside the printed feature are neglected.

Alternatively, some fine details of a printed background can be used as reference points to localize the flakes appropriately.

The orientation criterion can be implemented e.g. by exploiting the particle's reflection properties using illumination and observation under certain angular constraints. Only the particles which reflect light from the light source to the detector under the said conditions are considered, and the particles which do not reflect light under the said conditions are neglected. As is evident to the skilled person, a rotation or inclination of the marked item with respect to illumination source and detector will place another subset of particles in reflecting conditions; therefore, the workability of this type of selection strongly depends on the precise reproduction of the originally chosen reading conditions.

The graphic design criterion can be implemented by exploiting the particle's color or color-shift properties. The full surface coverage over a delimited area of a printed feature may e.g. be realized using a mixture of different types of particles. From these, one or more determined types may be used, separately or together, to derive said data representative of said random distribution. The selection of the particles as belonging to a determined type is herein based on a predetermined optical property.

Further to the marking method, the present invention also comprises a document or item carrying a marking according to what is outlined above. In particular:

A document or item marked in at least one area with a random distribution of CLCP flakes, characterized in that the CLCP flakes are reflecting a circular polarized light component.

A document or item marked as above, wherein said CLCP flakes have at least one spectral reflection band in at least one of the ultraviolet, visible, and infrared electromagnetic spectrum.

A document or item marked as above, wherein said CLCP flakes have at least two spectral reflection bands in at least one of the ultraviolet, visible, and infrared electromagnetic spectrum.

A document or item marked as above, wherein each spectral reflection band is individually left- or right-handed circular polarized.

A document or item marked as above, wherein said random distribution is produced in an area of at least 1 $mm^2$ preferably at least 25 $mm^2$, more preferably at least 100 $mm^2$.

A document or item marked as above, wherein said random distribution of CLCP flakes is applied over preexisting indicia.

A document or item marked as above, wherein said random distribution comprises between 3 and 1000 flakes, preferably between 10 and 300 flakes, more preferably between 30 and 100 flakes.

Further to this, the invention also comprises the use of cholesteric liquid crystal pigment (CLCP) flakes for marking a document or item with a random distribution of particles for authentication/identification with an authentication device, characterized in that said CLCP flakes are reflecting a circular polarized light component, and that said authentication device exploits circular polarization to discriminate the flakes of the marking from the background by forming a circular polarization difference image.

Said CLCP flakes have at least one spectral reflection band in at least one of the ultraviolet, visible, and infrared electromagnetic spectrum.

Alternatively, said CLCP flake have at least two spectral reflection bands in at least one of the ultraviolet, visible, and infrared electromagnetic spectrum.

Said CLCP flakes may further have each spectral reflection band individually left- or right-handed circular polarized.

A further aspect of the invention is the use of CLCP flakes as described above, wherein said random distribution is produced or exploited in a detection area of at least 1 $mm^2$ preferably at least 25 $mm^2$, more preferably at least 100 $mm^2$.

A further aspect of the invention is the use of CLCP flakes as described above, wherein said random distribution comprises between 3 and 1000 flakes, preferably between 10 and 300 flakes, more preferably between 30 and 100 flakes.

The concentration of CLCP flakes in the coating composition for authenticating an item according to the present invention is preferably between 0.01 to 20% by weight, more preferably 0.1% to 3% by weight; most preferably 0.2% to 1% by weight.

The invention further comprises a device for identifying or authenticating an item having a mark containing randomly distributed particles, said device comprising illumination means and optical detection means, characterized by means for detecting and analyzing circular polarized light and means for forming a circular polarization difference image.

The device according to the invention may have at least one circular polarizing filter, preferably each a right- and a left-circular polarizing filter.

The device according to the invention, may further have at least one color filter.

Said device comprises at least one electronic image sensor, chosen from the group consisting of the monochromic image sensors and the color image sensors; said image sensor may further be chosen from the group consisting of the CMOS and the CCD image sensors. Said device may be integrated into a device performing other functions, e.g. embodied as a camera mobile phone. Said device may further comprise an image splitting prism and two circular polarizing filters.

Figure 4:
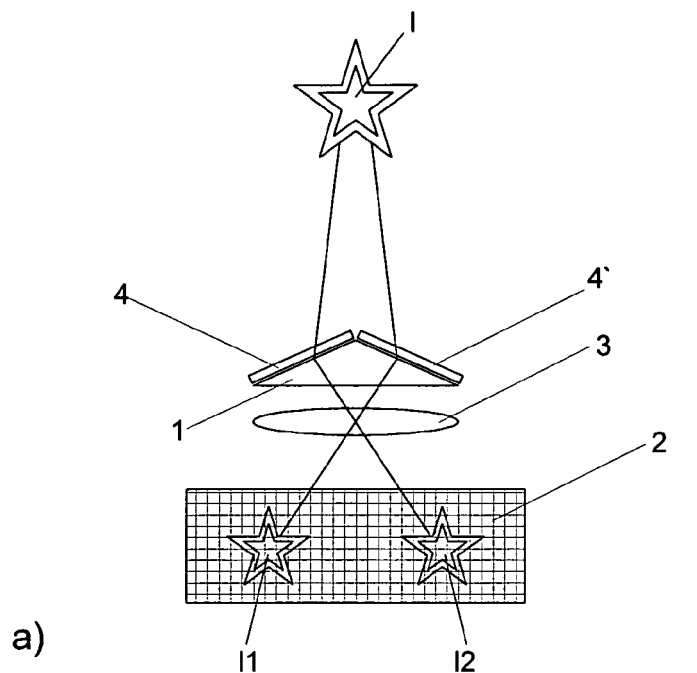
Figure 4:
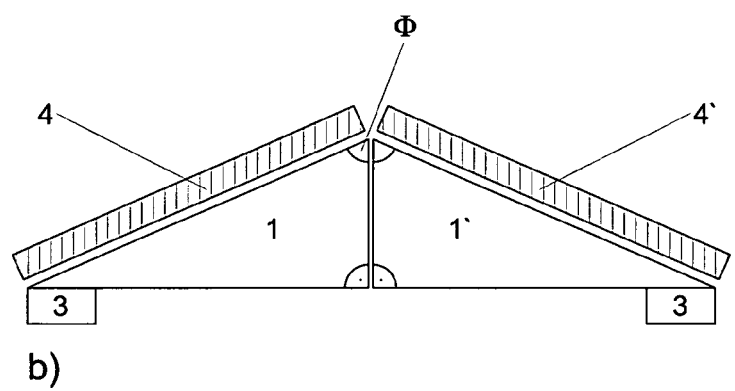
Figure 4:
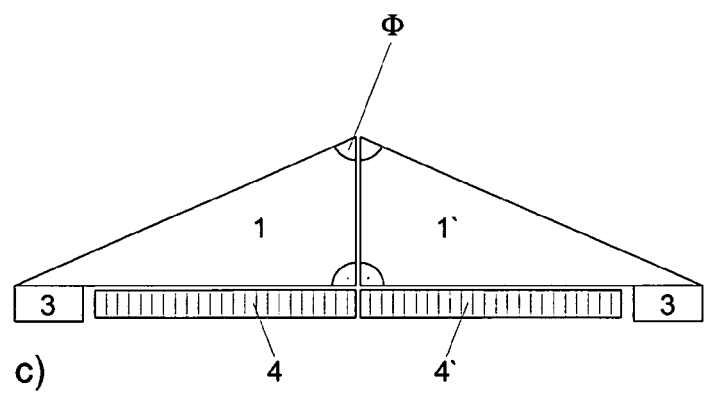
Figure 5:
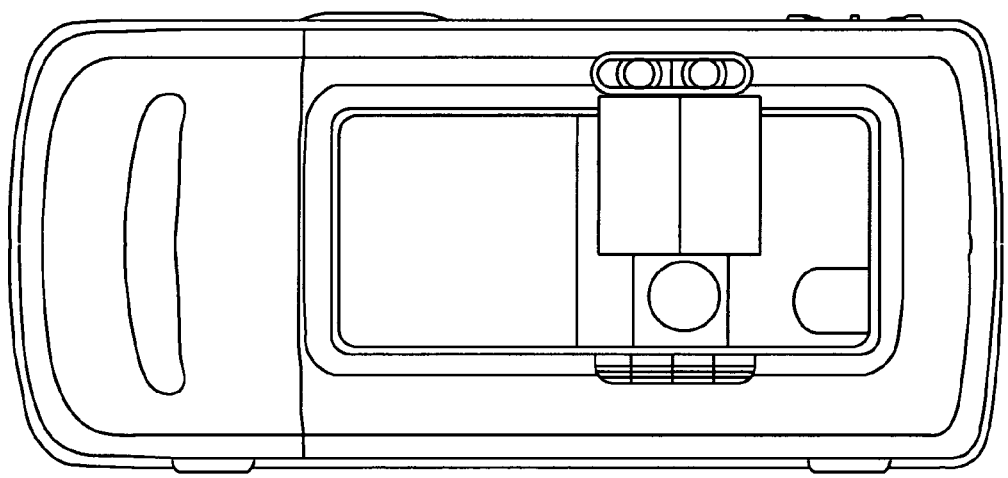

The preferred optical detection means comprise a compact and small prism (1) according to FIG. 4. The prism is embodied so as to be easily fitted to an existing imaging device (e.g. camera or a mobile phone) (2) without requiring major modifications of the latter (FIG. 5).

Said prism (1,1') may comprise reversibly fixing means (3) which may be embodied as a magnetic fixation, a screw, etc., so as to allow the prism to be fixed in front of the lens of the imaging device.

The prism (1), with reference to FIG. 4a, FIG. 4b, is preferably an isosceles prism, having a roof angle ($\Phi$) in the range of 140° to 170°. The prism may be of a single piece of an optically suitable material (glass, plastic) having a refractive index n in the range of 1.3 to 1.9. Alternatively, the prism may comprise two rectangular half prisms (1,1'), joined together so as to form a single prism (FIGS. 4b, 4c).

The reading device comprises said prism (1) combined with a lens (3, FIG. 4a) and an electronic image sensor. Said lens may be the one already present in the camera, mobile phone, etc. The function of the prism is to duplicate the image of the mark (I) into two identical images (I1, I2, FIG. 4a), which are imaged by the lens (3) onto the image sensor chip (2). The image sensor chip (2), which may be a CCD or a CMOS device, delivers simultaneously two images corresponding to each of both polarizations, respectively, of the mark (I).

To achieve this, the prism (1) comprises two polarization filters (4,4') which transmit left handed (4) and right handed circular polarized light respectively. The polarization filters may be disposed on both faces of the top (roof part) of the prism (FIG. 4b). Alternatively the filters (4,4') may be disposed on the bottom (base part) of the prism (FIG. 4c).

Additionally, said polarizing filters (4,4') may be combined with color filters, for the selective transmission of specific wavelength ranges.

Other types of prisms and other methods and devices to analyze circular polarization states in images are known to the skilled in the art and may replace the above described prism and filters in the functions required according to the present invention.

In particular, the respective functions of the prism and of the lens can be integrated together in a single device to form a twin-lens or a twin-Fresnel-lens; the individual parts of the twin lens can be provided with right- and left-handed circular polarizing filters.

The embodiment comprising a twin-Fresnel-lens provided with right- and left-circular polarizing filters is particularly preferred, because it is inexpensive and can be constructed as a single, flat sheet of plastic material.

The image data may also be recorded with the help of a digital camera equipped with a macro objective and the said image splitting optical element. A light-diffusing white-dome according to FIG. 8, which provides visual access to the sample through a hole, and which comprises omni-directional illumination means, may advantageously be used.

A preferred illumination means to be used with the said reading device comprises an annular light source which may be embodied as a ring of white or color LEDs, and which is used to illuminate the said white-dome. The dome, in turn, diffuses the light onto the sample, providing the condition that essentially all CLCP flakes present in the marking are visible in the image of the camera. Diffuse illumination sources are known to the skilled person and commercially available from various manufacturers (Siemens, Advanced illumination, CCS, etc.). In an alternative embodiment, colored illumination may be advantageously used to improve the contrast between the CLCP particles and the background.

In another embodiment according to the invention, the illumination means of the said reading device are not completely diffuse. Using at least partially directional illumination allows the selection of only the fraction of particles that satisfy the specific reflection condition for the chosen combination of illumination and detection angles.

A simple orthogonal illumination and detection set-up, with respect to the substrate plane (straight light, orthogonal view), allows to detect (i.e. to select) only those CLCP flakes which have their plane oriented within 20° or less in the plane of the substrate.

In a corresponding embodiment, the image data capture of a marking on a document or item is performed with a simple camera equipped with a macro objective and a prism whose two roofing faces have each a left- and a right-handed polarizing filter. Illumination is performed by a light source from the direction of the camera, e.g. a flash light. In this case, only part of CLCP flakes reflect light towards the camera and appear in the image. A selection of CLCP flakes is thus performed by the directional illumination means of the said reading device.

A series (k=1 ... N) of directional light sources may also be used, one of them switched on at a time, to take a corresponding series (k=1 ... N) of images of the same particle arrangement. The images may subsequently be combined into a single image taking for the intensity of each pixel i,j: I(i,j)= Max(I_1(I,j), I_2(I,j), ... I_N(I,j)). More than one directional light source may also be switched on at a time at each step of the sequence.

Said device may further comprise illumination means for illumination of the document or item by circular polarized light. In a first embodiment, a separate light source for right- and for left-handed circular polarized light is present; the light sources being alternately switched on and off. In a second embodiment, a single, unique light source having an electro-optic filter, such as disclosed in DE 102 11 310, allowing for the alternative selection of right- and left-circular polarization, is used. A unique light source and a mechanical switching of left- and right-handed circular polarization filters can also be provided.

Said device may further comprise hardware and software enabling it to perform data processing operations, as well as for the transfer of information via a wire-bound or wireless data links or via Internet. Data processing is noteworthy required for the acquisition (capture) of the image, for the scaling, aligning, and subtraction of the left- and the right-handed images of each other (matching and image processing), as well as for the interpretation of the result (authentication or identification of the marking). In case of a data link, some of these operations can be performed by a remote computer.

A further aspect of the invention is a process of making an authentication device for authenticating an item having a random distribution of CLCP flakes, characterized in that an image splitting optical element having each a left- and a right-handed circular polarizing filter is assembled with a camera mobile phone.

A further aspect of the invention is the use of the said authentication device, comprising an image splitting optical element having each a left- and a right-handed circular polarizing filter assembled with a camera mobile phone, for authenticating an item having a random distribution of CLCP flakes.

Said device may further comprise a color filter. As is obvious for those skilled in the art, a variety of filters can be used in combination with the polarization filters in order to improve the image quality. The spectral response of a black-and-white sensor, such as an electronic CCD or CMOS image sensor chip, can noteworthy be modified by appropriate color filters. Colored glass filters or interference filters can be used to improve the image contrast, taking advantage of the particle's reflection being located in determined wavelength regions of the electromagnetic spectrum.

In a method for authenticating or identifying, according to the present invention, and with reference to FIG. 4, a random distribution of CLCP flakes comprised in or on a determined area on a document or item, the said document or item is placed in front of the reading device comprising the said optical means, i.e. an image splitting, polarizing prism and a image sensor, so as to obtain an image from the image sensor. If required, dedicated illumination means are used.

In case the image splitting optical element is a prism, each of the sloped faces of the prism may comprise a left- and a right-handed polarizing filter respectively, thereby producing a separate image on two separate parts of the image sensor device, corresponding to the mark (I) as seen under left- and right-handed circular polarized light, respectively.

Both images (I1, I2) of the mark (I) are now mapped onto each other, applying, if required, translation and scaling operations, and the images (I1, I2) are subtracted from each other, to yield a difference image (I1-I2), which no longer contains non-polarizing background contributions.

From the difference image, the positions of the marking particles (flakes) are determined, and the document or item is authenticated or identified by comparing the positional data of the marking particles with pre-recorded information retrieved from a data base. The database, or part of it, can be embedded in the reading device, allowing stand-alone identification. Alternatively the database, or part of it, is hosted on an external server (computer) requiring remote interrogation to ascertain item authenticity or identity.

In general, the said difference image (I1-I2) is obtained by using two images of the same mark, taken through left- and right-handed polarizing filters, respectively; a point-by-point comparison of corresponding points of the two images is then required to determine whether at any given point a polarizing pigment flake is present or not, and whether the polarizing pigment flake reflects a left- or a right-handed light component. The correspondence of the points in the left- and right-handed images must be identified prior to any subtracting operation being performed. This can be achieved by an image matching algorithm, which is orienting itself at a graphical design or the like present in the zone of the marking, giving an indication of the local image elements. Such image matching algorithms are known to the skilled in the art and available.

In a first preferred embodiment of the marking according to the present invention, the CLCP marking flake reflects a light component of a single circular polarization within a wavelength range in the visible spectrum. The presence or absence of such flake can in consequence be determined from the difference in reflectivity for left- and right-handed circular polarized light in the said range of the spectrum.

In a further embodiment, the CLCP flake reflects light in more than one range of the visible spectrum; in each of them, it can be made to reflect either a left-handed or a right-handed light component independently. The dual-handed (left-handed and right-handed) circular polarizing flakes are detectable with the help of a combination of polarization and color filters, uniquely.

An important advantage of CLCP flakes is their rather large flake size of between 20 to 100 micrometers and their rather reduced thickness of about 1 to 10 micrometers (typically 3 micrometers). The moderate thickness of the CLCP flakes allow them to be incorporated into the common printing inks (e.g. into an overprinting varnish) and to be printed with the common printing equipment, despite the rather large flake size, not the least because the CLCP flakes are to a certain extent flexible materials.

The large size of the CLCP flakes used as the marking particles in the present invention allows their easy detection on a document or item. Given the large size of the flakes, the marking area can be chosen large as well, to be easily localized. The transparent CLCP flakes can be applied over existing indicia. The CLCP flakes containing overcoat seals hereby the indicia; it can ascertain that the indicia have not been tampered.

About 20 to 50 flakes are sufficient to unambiguously identify a large number of documents or items; thus limiting the quantity of data which must be treated and be pre-recorded in the reference database.

Depending on the document or item to be identified, the zone wherein the marking is applied may extend over the effectively used identification zone; in the extreme case, the whole document or item may be the target of the marking.

The adverse effects of damaging and soiling of the marked document or item are reduced because the identification according to the present invention does not need a complete matching between the actually retrieved flake pattern and the pre-recorded pattern in the reference data base. Indeed, the authenticity of a document or item can be assured if only a part of the pre-recorded flake positions in the data base are encountered on the document or item in question. On the other hand, if flakes are present on the document or item, which are not found in the pre-recorded reference data base, the document or item in question is to be regarded as being counterfeit. These advantages together overcome many of the problems of the prior art as to poor authentication speed, jamming, soiling of the document, etc.

The area of the marking comprises the area used for detection (reading) of the marking, but may be much larger than this latter. The preferred size of the detection area is one square cm, but, depending on the application, a smaller or a larger size may also be chosen. The detection area may also be as large as the whole sample. When the detection area is large, the positioning of the reading device is easier; authentication and identification will be faster. In all cases, the area captured by the reading device should be larger than the actual area of the marking to be authenticated, in order to allow for compensation of small positioning errors of the document or item carrying the marking. The authentication of the marking necessarily comprises the step of its exact location on the document or item.

The data size of a signature, i.e. of a data set reflecting the presence of marking particles at specific positions, is a sensitive point. As known to the skilled in the art, the identification of extensive data records requires a time-consuming search in the reference data base, and in order to reduce the search time in the data base, it is necessary to limit the size of the signature itself. Several parameters can be used to define the signature of an item, such as the flake positions, orientations, their colors, their double polarizations where applicable, etc. An important reduction of the signature size can be achieved in restricting the signature to represent flake positions only.

To further reduce the size of the data set to be treated, data retrieved from neighboring pixels in the detection area may be combined in order to reduce noise and to obtain an unambiguous signature of the item. E.g. the data of a square of four, nine or sixteen, etc. neighboring pixels may be combined to represent the value of a "macro-pixel". This means that only large and brilliant flakes or flake clusters, extending over more than one pixel, are used in the final data set ("macro-pixel algorithm"). Other statistical means of noise reduction, such as gliding means or spectral filtering in the Fourier domain, may also be applied to reduce the size of the data set to be treated.

The authentication of an item may be performed on few parameters only, preferably the location in the determined area chosen to ascertain the genuineness of the item. Alternatively, other parameters of the flakes, such as the orientation, the color, the color-shift with observation angle, etc. may be included into the data set which is stored as the authenticity reference on the data base.

The use of a random distribution of CLCP flakes generates a unique identity of the item. Said distribution has several "degrees of randomness" which a forger would have to match for making an exact copy. These degrees are: the position of each CLCP flake, the freedom of orientations of said flakes on all three axes; their diameter; their colour and colour-shift; their polarization (left-handed, right-handed or both); their depth in the varnish; the colour of the first layer of the item. The overall chances of successfully duplicating the mark are exceedingly small because many flakes must match the reference at the same time.

In increasing the amount of CLCP flakes, the risk of forgery is reduced due to the difficulty to reproduce the marking. The manufacturing of the CLCP flakes itself is already not easy and a large variety of different types of CLCP flakes can be made. The unavailability of the correct material is a first, important hurdle to the counterfeiter. The second hurdle is the difficulty of reconstructing the flake distribution in the signature area and matching all degrees of randomness.

A document or item is authenticated or identified by the comparison of the retrieved data about the flake positions, orientations, color, color-shift, etc. in the marking area of the document or item with the "signature" of the original document or item, which has been previously stored in a database. An indexed or a raw data base may be used. Indexed data bases have the advantage of allowing for a rapid, content-driven search and access of the information.

If flake locations are found on the document or item which do not correspond to the originally stored information, the document or item is considered counterfeit. If the originally stored information contains flake locations which are not present on the document or item, the document or item is considered authentic. It may be required that a minimum percentage of the original flakes must be present for the marking to be accepted as authentic. E.g. a signature may be deemed authentic when 85% of locations of the random CLCP flakes match the original pre-recorded signature in the database. The comparison may also be restricted to a part only of the "signature" of the document or item, in order to save time. A sufficient number of flake positions must, however, be compared, in order to obtain an unambiguous identification.

The marking of the present invention, which is an individual signature of each document or item, can serve to track or to trace the document or item. The random distribution of the CLCP flakes in the marking area, or of at least a selection of said flakes, is pre-recorded in a data base. At a later time, the document can be checked by a suitable reader device (which may be a correspondingly modified camera mobile phone or a modified commercial scanning device such as a commercial flat-bed scanner, but which is preferably a dedicated reader device), and the retrieved "signature", corresponding to the flake positions, can be identified in the said data base, i.e. the document's identity can be determined.

The invention is now further illustrated with the help of figures and exemplary embodiments.

FIG. 1: schematically depicts the method and system of marking and identifying according to the present invention FIG. 2: schematically depicts a marking according to the present invention.

Figure 3:
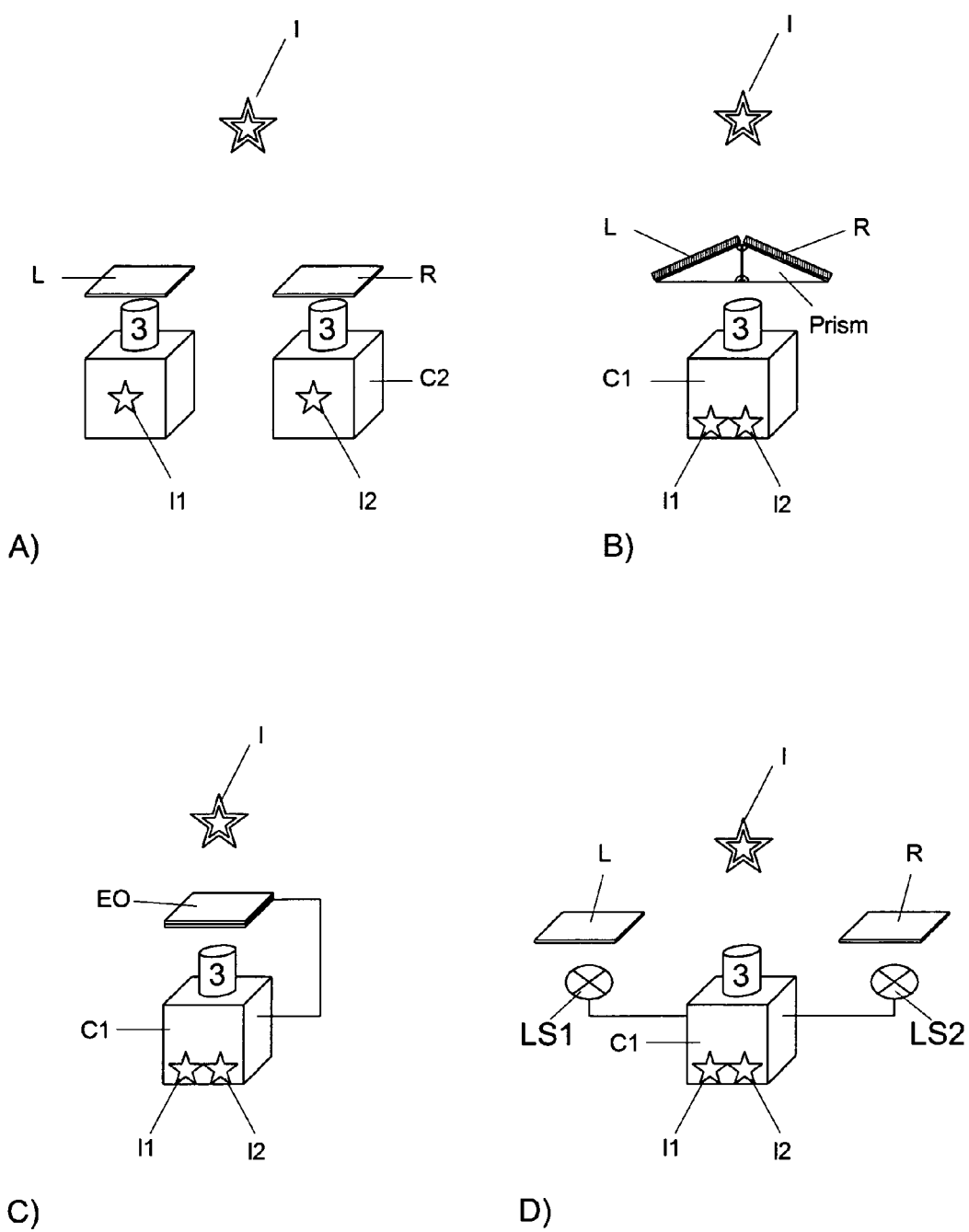

FIG. 3: schematically depicts a reader device according to the present invention, according to different, possible embodiments:
  A) two cameras having a left- and a right-circular polarization filter, respectively;
  B) a single camera having an image splitting prism comprising a left- and a right-circular polarization filter;
  C) a single camera having an electro-optic switch for the sequential selection of left- and right-handed circular polarization;
  D) a single camera, having a sequential left- and right-handed polarized illumination.

FIG. 4: a) illustrates the function of a polarizing image-splitting prism mounted on a camera;
  b) schematically depicts a first embodiment of the polarizing image-splitting prism;
  c) schematically depicts a second embodiment of the polarizing image-splitting prism;

FIG. 5: Embodiment of a camera mobile phone comprising a polarizing image-splitting prism FIG. 6: shows a marking on a graph paper (mm-grid spacing), according to the present invention: a) realized with an ink comprising 1 wt % of CLCP flakes; b) realized with an ink comprising 0.2 wt % of CLCP flakes.

Figure 7:
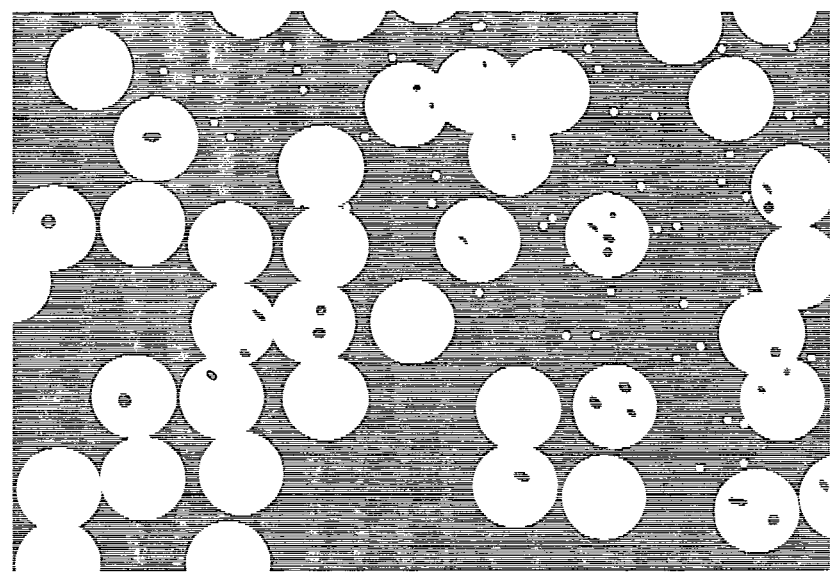
Figure 7:
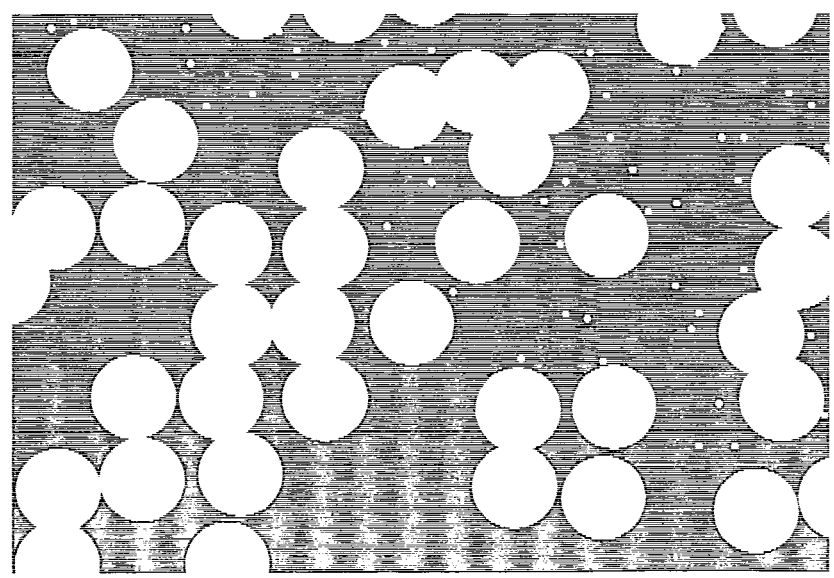
Figure 7:

FIG. 7: shows the image of a marking according to the present invention, realized on top of a data matrix code: a) taken through a right-handed circular polarizing filter; b) taken through a left-handed circular polarizing filter; c) difference of image a) and image b).

Figure 8:
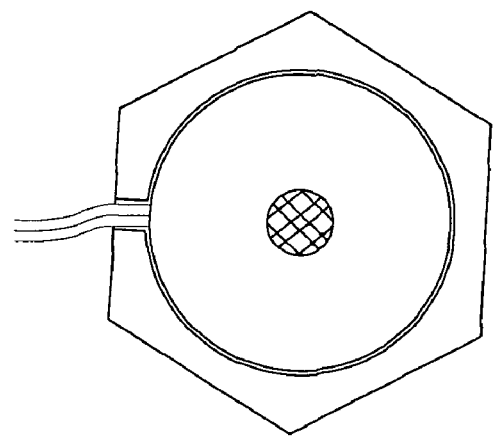
Figure 8:
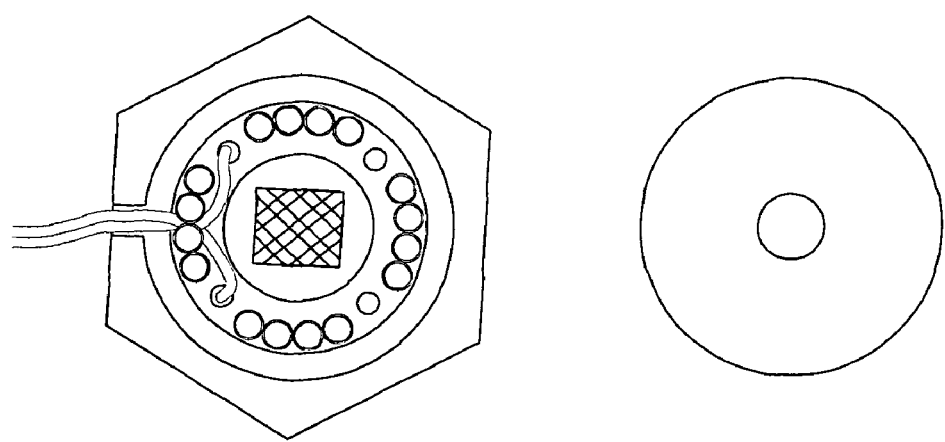

FIG. 8: shows preferred illumination means comprising a ring of white LEDs located within a white diffusing sphere.

EXEMPLARY EMBODIMENTS

FIG. 1 shows an exemplary embodiment of the method according to the present invention of marking and identifying a document or item with the help of circular polarizing particles, using a device for authenticating/identifying the marked document, in conjunction with further hard- and software to embody a system for tracking and tracing operations.

A document or item, such as a label (1), is marked using an ink comprising circular polarizing CLCP flakes (2) at appropriate concentration. The resulting marking (3) is recorded using a camera (4), having appropriate imaging optics (5) and a circular polarizing filter (6). It is understood that, in the scheme, said circular polarizing filter (5) represents both, a left-handed and a right-handed circular polarizing filter, or an electro-optic filter. Illumination means (7) are present as well. The image data obtained from said marking using left-handed and right-handed circular polarized light is treated in a first computer (8), having corresponding software, and a signature (S) is derived from the marking and stored on a data base (9).

The item (1) is then used on a product (Product) to be tracked or traced. For identifying the product, image data of the marking (3) is recorded, using a reader device (12). The reader device (12) may send the recorded image data via a wireless link (L) to a base station (11) linked to a second computer (10). Said second computer (10) having corresponding software, derives a signature from the received image data and compares it with the library of signatures stored in the data base (9). The signature is hereby either found to occur in the said data base (9), and the product is identified as to its origin and trace record; otherwise the product is deemed not to be genuine.

FIG. 2 shows a marked SICPA stamp having the preferred size of one square cm. The detection area comprises the whole stamp. Said stamp has been overprinted with a varnish comprising 1% by weight of right-handed circular polarizing CLCP flakes. The image was recorded using a right-handed circular polarizing filter, combined with a 570 nm low-pass filter, transparent for light with wavelength above 570 nm and blocking light with wavelength below 570 nm. The flakes are clearly visible on the dark areas of the stamp.

FIG. 3 schematically depicts four different types of set-ups for reading the marking:

The reading device according to embodiment A) comprises two separate electronic image sensors (C1, C2), having a lens or optics (3) and a left-handed or right-handed circular polarizing filter (L, R), respectively. The marking (I) is imaged by a first image sensor (C1) to yield a first image (I1) through the left-handed polarization filter (L), and imaged by a second image sensor (C2) to yield a second image (I2) through the right-handed polarization filter (R).

The reading device according to embodiment B) comprises a single image sensor (C1) having a lens or optics (3) and an image-splitting prism (Prism) with a left- and a right-handed circular polarization filter (L, R) disposed on the two surfaces of the roof of the prism, respectively. Both polarized images (I1, I2) of the marking (I) are obtained simultaneously in the same image sensor (C1).

The reading device according to embodiment C) comprises a single image sensor (C1) having a lens or optics (3), and an electro-optic filter (EO), alternately switched to select right-handed or left-handed circular polarization. Both polarized images (I1, I2) of the marking (I) are obtained sequentially in the same image sensor (C1).

The reading device according to embodiment D) comprises a single image sensor (C1) having a lens or optics (3), and two light sources (LS1, LS2), having a left-handed and a right-handed circular polarizing filter (L, R), disposed in front of them respectively. The light sources are alternately switched on and off, providing the marking (I) with alternate right-handed and left-handed circular polarized illumination. The image sensor takes images of the marking (I) under said right- and left-handed circular polarized illumination. Both polarized images (I1, I2) of the marking (I) are thus obtained sequentially in the same image sensor (C1).

In a further variant of embodiment D) (not shown), a single light source, having an electro-optic filter for the selection of the polarization, can be used.

FIG. 4a schematically depicts the function of a preferred optical means of the invention, allowing to simultaneously record a left-handed and a right-handed polarization image of a marking (1) using a single electronic image sensor (2). The image of the marking (I) is hereby split into two images (I1, I2 by the two faces of a compact prism (1), disposed in front of the lens or optics (3) of the image sensor (2). A left-handed and a right-handed polarization filter (4, 4') are disposed, respectively, in front of the said two faces of the compact prism (1), in order to select the polarization of each image.

A left-handed circular polarizing filter is predominately transparent for left-handed polarized light, such as the light component reflected by a left-handed circular polarizing flake of the marking on the item. Right-handed circular polarized light will not pass the left-handed filter and objects reflecting right-handed circular polarized light will appear in black in the image, i.e. they will not be visible at all; the same holds in the opposite sense, for a right handed polarization filter.

FIG. 4b gives a detailed view of a section across the prism of FIG. 4a: The prism (1) may be a unique body, but it can also be composed of two rectangular half-prisms (1, 1'). The roof angle (Φ) of the prism is comprised in the range of 140° to 170°. Lower roof angles result in significantly lower transmission through the prism and in important image aberration, and higher roof angles result in a too small separation of the two images (I1, I2). The left- and the right-handed polarization filters (4, 4') are disposed in front of both roof surfaces of the prism. Fixing means (3) are disposed at the base of the prism (1, 1'), in order to allow its reversible attachment to an image sensor device.

FIG. 4c shows an alternative embodiment of the prism, wherein the left- and the right-handed polarization filters (4, 4') are disposed at the left-hand and the right-hand side of the base of the prism, respectively.

There can also be provided an image splitting optical element comprising a twin-lens with polarizing filters; each part of the lens producing a separate image of the object on a common image sensor device.

The image splitting optical element comprising can comprise a twin-Fresnel-lens with polarizing filters.

FIG. 5 shows the prism attached to a camera mobile phone; the latter serving as the reading device.

Figure 6:
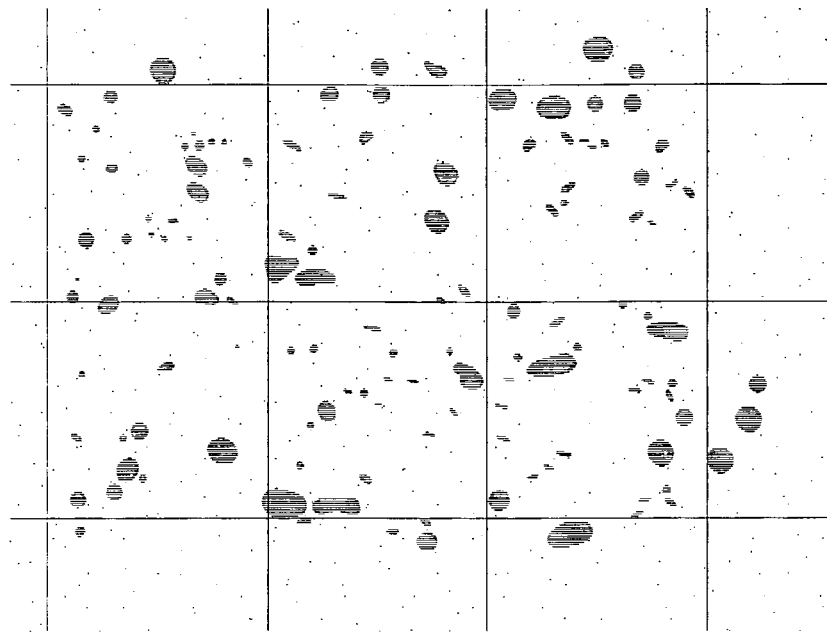
Figure 6:
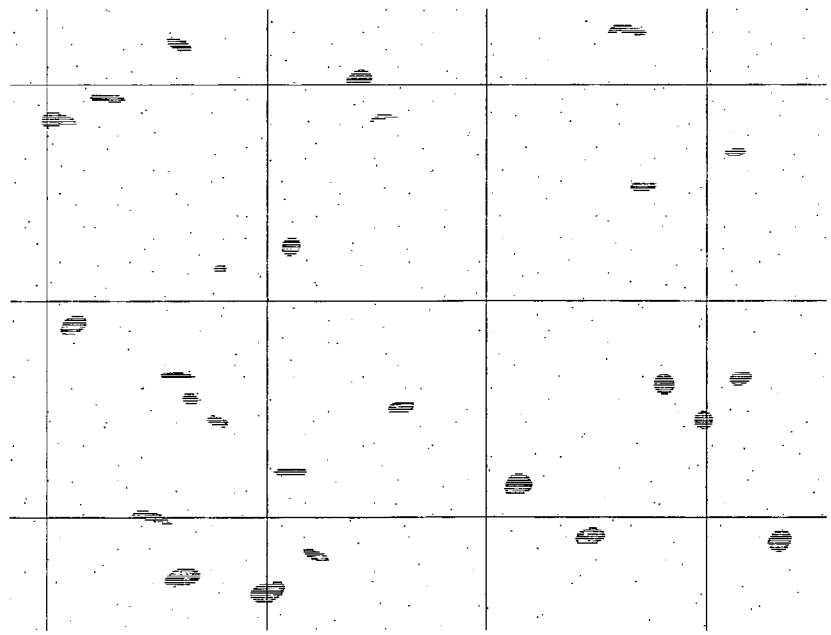

In a first exemplary embodiment of the marking, according to FIG. 6, the optimal concentration of CLCP flakes in the ink was determined. To this aim, silkscreen inks of the following generic formula were prepared:

| Base Formula | | Ink 0.2% | Ink 1% |
|---|---|---|---|
| Oligomers | 50% | | |
| Monomers | 30% | | |
| Aerosil 200 | 3% | | |
| Ink vehicule: total | | 83% | 83% |
| Photoinitiator: total | | 10% | 10% |
| Additives: total | | 6.8% | 6% |
| CLCP flakes | 0.2% to 1% | | |
| Pigments: total | | 0.2% | 1% |
| Total | | 100% | 100% |

The viscosity of the ink was adjusted to a value in the range of 0.5 to 1 Pa·sec, by means known to the skilled in the art.

The aim of this example was to show the number of CLCP flakes per surface obtained after printing and curing the inks. The inks were printed onto millimeter paper using the silkscreen printing technique with a screen 77T. The printed inks were UV-dried.

FIG. 6a shows an image obtained from the printed and cured ink comprising 1 wt % of CLCP flakes. The use of a 570 nm low-pass filter facilitated the detection of the CLCP flakes. Such filter is transparent for light with wavelength longer than 570 nm and blocks light with wavelength shorter than 570 nm. As can be seen from FIG. 6a, about 35 flakes are present per square millimeter.

FIG. 6b shows the case of an ink comprising 0.2 wt % of CLCP flakes, printed using the same conditions. The image, taken under the same conditions, shows about 7 flakes to be present per square millimeter.

In a further exemplary embodiment of a making according to the present invention, and with reference to FIG. 7, a matrix code was overprinted with a silkscreen ink comprising 1 wt % of CLCP flakes. Said marking was printed using the silkscreen printing technique with a screen 77T. The printed marking was UV-dried.

FIG. 7a shows a negative (inverted) image of the marking so obtained, taken through a left-handed circular polarization filter. The CLCP flakes are visible as dark spots on the larger white spots of the matrix code. In the dark (originally white) areas of the matrix code, the flakes are barely visible.

FIG. 7b shows the same region as FIG. 7a, but taken through a right-handed circular polarizing filter. No flakes are visible any more. The few, dark spots in the image are due to printing imperfections.

FIG. 7c shows the difference image, obtained by subtracting the image of FIG. 7b from the image of FIG. 7a. The CLCP pigment flakes are visible as dark spots, wherever they are present; the background matrix code is almost completely suppressed.

FIG. 8 shows a preferred illumination means, comprising a ring of 16 white LEDs inside a white diffusing dome (half sphere). Said illumination means allows to illuminate a document or item in an omni-directional way, such as to make visible virtually all CLCP flakes of the marking, independent on their actual orientation within the coating constituting the marking. The imaging device is inserted through a hole in the top of the white diffusing dome.

TABLE I

| | | Detection | | | |
|---|---|---|---|---|---|
| | | L | R | U | R − L |
| Illum. | L | $\eta I_L/(2 - \eta F_R)$ | $\eta I_L (1 - F_R)/(2 - \eta F_R)$ | $\eta I_L (2 - F_R)/(2 - \eta F_R)$ | $-\eta I_L F_R/(2 - \eta F_R)$ |
| | R | $\eta I_R (1 - F_R)/(2 - \eta F_R)$ | $I_R F_R + \eta I_R (1 - F_R)^2/(2 - \eta F_R)$ | $I_R F_R + \eta I_R (1 - F_R)(2 - F_R)/(2 - \eta F_R)$ | $I_R F_R - \eta I_R F_R (1 - F_R)/(2 - \eta F_R)$ |
| | U | $\eta I (2 - F_R)/(2 - \eta F_R)/2$ | $I F_R/2 + \eta I (1 - F_R)/(2 - F_R)/(2 - \eta F_R)/2$ | $I F_R/2 + \eta I (2 - F_R)^2/(2 - \eta F_R)/2$ | $I F_R/2 - \eta I F_R(2 - F_R)/(2 - \eta F_R)/2$ |

Scenarios for different illumination-detection schemes on various backgrounds:
Illuminaton is assumed perfectly diffused.
Flakes are supposed to reflect R-polarized light with efficiency $F_R$ and to transmit L-polarized light. The result for L-polarizing flakes is obtained exchanging the L and R indexes in the tables).
Illumination:
L: Left-polarized; $I_L$: intensity of left-polarized light ($I_R = 0$)
R: Right-Polarized; ; $I_R$: intensity of right-polarized light ($I_L = 0$)
U: Unpolarized; ; I: intensity of unpolarized light ($I_R = I_L = I/2$)
Detection:
L: Left-polarized
R: Right-Polarized
U: Unpolarized
Background:
Reflection coefficient $\eta$ ($0 < \eta < 1$). Upon reflection, polarization information is lost.

The invention claimed is:

1. A method of marking and identifying or authenticating an item, wherein the method comprises at least one of
   (i) providing the item with a mark comprising randomly distributed cholesteric liquid crystal polymer (CLCP) flakes reflecting a circular polarized light component and recording and storing data representative of the random distribution using a first reading device that comprises illumination and optical detection units, and
   (ii) identifying or authenticating the marked item by reading data representative of the random distribution with a second reading device that comprises illumination and optical detection units and comparing read data with stored data, the first and second reading devices detecting circular polarized light reflected from the CLCP flakes and discriminating the flakes from a background thereof by forming a circular polarization difference image.

2. The method of claim 1, wherein the circular polarization difference image is formed from two images obtained under different polarization conditions selected from unpolarized, left-circular polarized, and right-circular polarized.

3. The method of claim 1, wherein the circular polarization difference image is formed from two images obtained under left-circular polarized and right-circular polarized conditions, respectively.

4. The method of claim 1, wherein the CLCP flakes exhibit at least two spectral reflection bands in at least one of the ultraviolet, visible, and infrared electromagnetic spectrum.

5. The method of claim 4, wherein each spectral reflection band is individually left-handed polarized or right-handed circular polarized.

6. The method of claim 1, wherein the random distribution is produced or detected in an area of at least 1 mm$^2$.

7. The method of claim 1, wherein the random distribution is produced or detected in an area of at least 100 mm$^2$.

8. The method of claim 1, wherein the random distribution comprises from 3 to 1000 flakes.

9. The method of claim 1, wherein the random distribution comprises from 30 to 100 flakes.

10. The method of claim 1, wherein the data representative of the random distribution is obtained by selecting a number of flakes among a larger total number of flakes according to a pre-defined criterion.

11. The method of claim 10, wherein the pre-defined criterion comprises position.

12. The method of claim 10, wherein the pre-defined criterion comprises orientation.

13. The method of claim 10, wherein the pre-defined criterion comprises graphic design.

14. The method of claim 1, wherein each of the first and second reading devices comprises at least one circular polarizing filter.

15. The method of claim 14, wherein each of the first and second reading devices comprises a right-circular polarizing filter and a left-circular polarizing filter.

16. The method of claim 1, wherein each of the first and second reading devices comprises at least one color filter having a band pass in at least one of the ultraviolet, visible and infrared electromagnetic spectrum.

17. The method of claim 1, wherein the item is provided with the random distribution of CLCP flakes by at least one coating technique selected from coating or printing with a liquid composition, coating or printing with a pasty coating composition, coating or printing with a solid, and "bronzing".

18. The method of claim 1, further comprising at least one of overprinting and coating the random distribution of CLCP flakes with indicia.

19. The method of claim 1, wherein the random distribution of CLCP flakes is applied on top of pre-existing indicia.

20. The method of claim 1, wherein the random distribution of CLCP flakes is applied by applying a preconfigured pattern of ink droplets.

21. The method of claim 1, wherein the item is provided with the random distribution of CLCP flakes in the form of at least one of a label, a laminate, a film, and a transfer foil.

* * * * *